(12) United States Patent
Chinner et al.

(10) Patent No.: US 7,827,556 B2
(45) Date of Patent: Nov. 2, 2010

(54) METHOD FOR EQUITABLE RESOURCE SHARING BETWEEN LOCAL AND NETWORK FILESYSTEMS

(75) Inventors: David Chinner, Victoria (AU); Michael Anthony Gigante, Victoria (AU)

(73) Assignee: Silicon Graphics International, Fremont, CA (US)

( * ) Notice: Subject to any disclaimer, the term of this patent is extended or adjusted under 35 U.S.C. 154(b) by 1144 days.

(21) Appl. No.: 10/620,835

(22) Filed: Jul. 17, 2003

(65) Prior Publication Data

US 2005/0015770 A1    Jan. 20, 2005

(51) Int. Cl.
*G06F 9/46* (2006.01)
(52) U.S. Cl. .......................... 718/104
(58) Field of Classification Search ........... 718/104; 709/200, 229; 370/395.6
See application file for complete search history.

(56) References Cited

U.S. PATENT DOCUMENTS

| | | | |
|---|---|---|---|
| 5,748,892 A * | 5/1998 | Richardson | 709/200 |
| 6,515,994 B1 * | 2/2003 | Chuah et al. | 370/395.6 |
| 7,032,222 B1 * | 4/2006 | Karp et al. | 718/104 |
| 7,284,062 B2 * | 10/2007 | Krantz et al. | 709/229 |

* cited by examiner

*Primary Examiner*—Li B Zhen
*Assistant Examiner*—Eric C Wai
(74) *Attorney, Agent, or Firm*—Baker Botts L.L.P.

(57) ABSTRACT

Computing resources shared by local and network filesystems may be used to maximum capacity by a single application, or equitably shared by multiple applications under heavy load. A portion of the resources are set aside for local filesystem use and a small number is reserved for each network filesystem. The remaining resources may be used by either local or network filesystems. An enforcement limit puts a ceiling on the number of resources that can be used by a single network filesystem. When the enforcement limit is applied to a filesystem, the number of executing resource acquisition requests from that filesystem is reduced, by completion of the requests, to the reserved number of resources for that filesystem before any more resources acquisition requests from that filesystem are executed.

18 Claims, 5 Drawing Sheets

METHOD FOR EQUITABLE RESOURCE SHARING BETWEEN LOCAL AND NETWORK FILESYSTEMS

CROSS-REFERENCE TO RELATED APPLICATION(S)

This application is related to NETWORK FILESYSTEM ASYNCHRONOUS I/O SCHEDULING, filed concurrently by David Chinner and Michael A Gigante and incorporated by reference herein.

BACKGROUND OF THE INVENTION

1. Field of the Invention

The present invention is directed to resource sharing in a computing system and, more particularly, to how scarce resources are allocated.

2. Description of the Related Art

A network filesystem, such as NFS from Sun Microsystems, Inc. of Santa Clara, Calif., provides access to files in centralized storage by client computer systems in a client-server operating environment. Such network filesystems generate resource acquisition requests for read and write access to data and to obtain metadata or information about the data, such as data structure, etc.

The resource acquisition requests are generated by both local filesystems that access storage connected to the system executing the process that needs access to the data, and network filesystems for remote data accessed via a network connected to the system executing the process that needs access to the data. Execution of a resource acquisition request assigns one or more resources of which there are a fixed number, such as handles for buffers, pages of memory for storage of actual data, structures required for data caching, etc. Conventionally, the resources are assigned as the resource acquisition requests are generated, whether they are for a local filesystem or a network filesystem, until a maximum number of resources are in use. Due to the remoteness of the data to be accessed, it takes longer to execute network resource acquisition requests. As a result, it is not uncommon for a single or a group of network filesystems to monopolize all of the resources and "starve" other filesystems, particularly local filesystems, from having their resource acquisition requests executed.

Specifically, when multiple read operations are interspersed with heavy write traffic, a client node may experience file and directory read delays due to scheduling difficulties. At any time, write requests can greatly outnumber read and read-ahead requests, and all new requests are placed at the end of a request queue. Since an application must wait for a file server to read data before it can continue, read throughput is extremely latency sensitive. Use of read-ahead instructions attempts to reduce the latency by queuing the next block before the application requests it. However, the read-ahead requests are conventionally placed on the same first-in, first-out (FIFO) queue as write requests. Through the use of a buffer cache, a client node can queue a large number of write requests, but only a small number of read requests at a time. As a result, an asynchronous request queue may be dominated by write requests.

Basically, there are three methods for handling a resource shortage: (A) stop using the resource until there are free resources; (B) manage accesses to the shared resource such that it is always available but may involve waiting until the resource becomes available; or (C) redesign the system such that it doesn't need the shared resource to function. Solution (A) is inefficient and solution (C) requires lots of programming and in most cases other trade-offs. Therefore, it is desirable to implement solution (B) by finding an equitable way of allocating resources that avoids starvation of one or more filesystems, while executing resource acquisition requests efficiently.

SUMMARY OF THE INVENTION

It is an aspect of the present invention to equitably share computing resources between local and network filesystems, particularly as the resources become scarce.

It is another aspect of the present invention to permit a single application, process or filesystem to maximize use of resources when there is no other demand for the resources, but to restrict usage of the resources for access to individual filesystem(s) as necessary to permit use of the resources to provide access to other filesystems.

It is a further aspect of the present invention to provide a configurable set of control parameters to adjust behavior of a resource scheduler.

The above aspects can be attained by a method of processing requests to access computing resources while restricting processing of resource acquisition requests when a number of resources in use is within a first predetermined amount of a maximum number of available resources. In one embodiment, the resource acquisition requests include local resource acquisition requests generated by at least one local filesystem for access to local storage and network resource acquisition requests generated by at least one network filesystem for access to remote data via a network. In this embodiment, the maximum number of available resources represents the available resources for the network resource acquisition requests and in addition, a local reserved number of the resources are available for the local resource acquisition requests.

Preferably, an enforcement limit, smaller than the maximum number of available resources by the first predetermined amount, is flexibly applied to the network resource acquisition requests as follows. Each network filesystem has a soft limit for executing the network resource acquisition requests, and a first network resource acquisition request is held in a first filesystem queue if execution of the first network resource acquisition request would cause the enforcement limit to be exceeded and the soft limit for a first network filesystem that generated the first network resource acquisition request has been exceeded. The first resource acquisition request and any subsequently received resource acquisition requests for the first network filesystem continue to be held until either the executing resource acquisition requests for the first network filesystem are below the soft limit or the first resource acquisition request has been held on the first filesystem queue longer than a predetermined time period. Upon completion of execution of each of the resource acquisition requests, execution of a longest held resource acquisition request in a corresponding network filesystem queue is initiated if the corresponding network filesystem queue is not empty and the executing resource acquisition requests generated by a corresponding network filesystem are below the soft limit by a second predetermined amount.

Preferably, when a new network resource acquisition request is received, the network resource acquisition requests are flushed if the maximum number of available resources are in use. If flushing does not make sufficient resources available, the new network resource acquisition request and any subsequently received network resource acquisition requests are held in a global wait queue until the number of resources in use is less than the maximum number of available resources. The flushing of the network resource acquisition requests is repeated each time a new network resource acquisition request is received, until the number of resources in use is less than the maximum number of available resources. When a resource acquisition request completes execution, any network resource acquisition requests held in the global wait queue are released if the number of resources in use is less than the maximum number of available resources.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
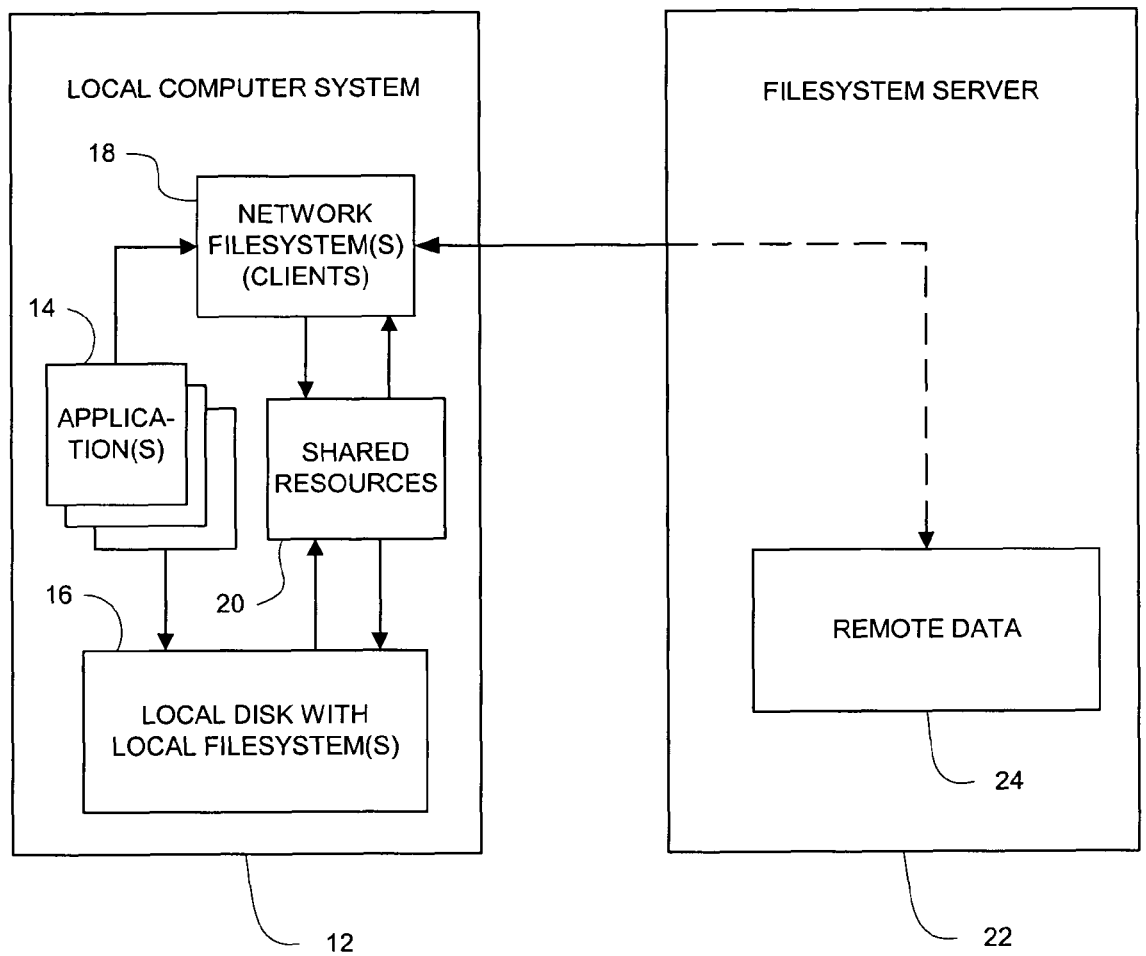
FIG. 1 is a block diagram of a system to which the present invention can be applied.

As illustrated in FIG. 1, local computer system 12 executes one or more applications 14 which may send data to local disk 16 with a local filesystem, or client process 18 for a network filesystem. Both local and network filesystems require shared resources 20, such as buffers to access data read or written by application(s) 14.

In the case of a resource acquisition request from a local filesystem, one or more shared resources 20 are assigned for use by the local filesystem, so that the resource acquisition request can be executed. When the data has been accessed, e.g., data has been copied into the shared resource by the application 14 and then written to local disk 16 by application 14, the shared resource(s) is/are released back to the available pool of resources for use by subsequent resource acquisition requests.

In the case of a resource acquisition request from network filesystem(s) 18, the process of requesting shared resource(s) 20 is similar to that of the local filesystem(s) described above. However, once the shared resource has been assigned, the network filesystem 18 communicate with filesystem server 22 to access remote data 24. This can require multiple communications potentially in multiple stages with a bounded length time delay between them. When more resource acquisition requests are being generated than there are shared resources 20, the resource acquisition request generated by local filesystem(s) execute more quickly and give up their turn to a waiting resource acquisition request which is likely to be a network resource acquisition request, since they take longer to execute. As a result, local filesystems are often starved of shared resources 20 by network resource acquisition requests.

Figure 2:
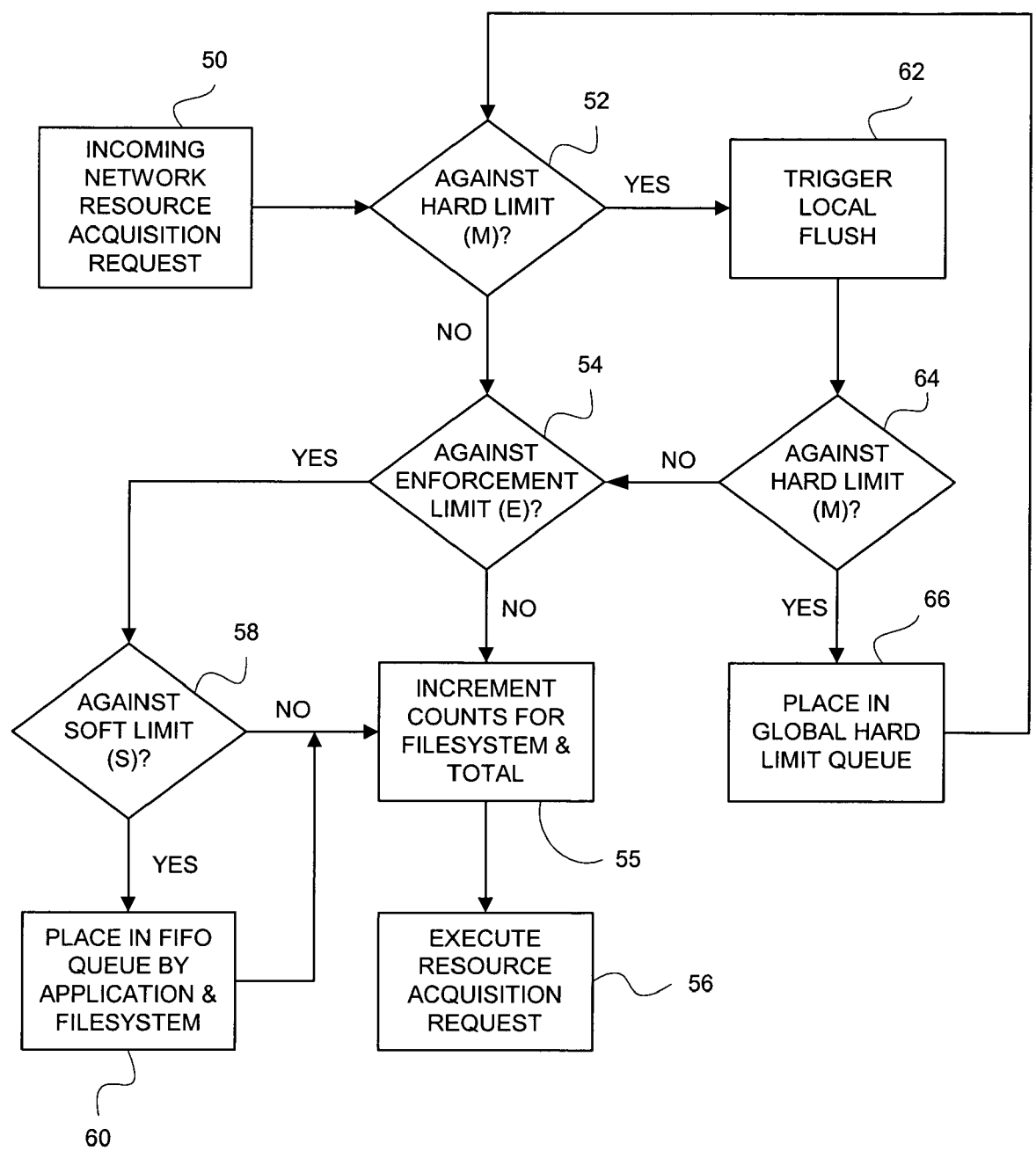
FIG. 2 is a flowchart of throttling shared resource requests according to the present invention.
Figure 3:
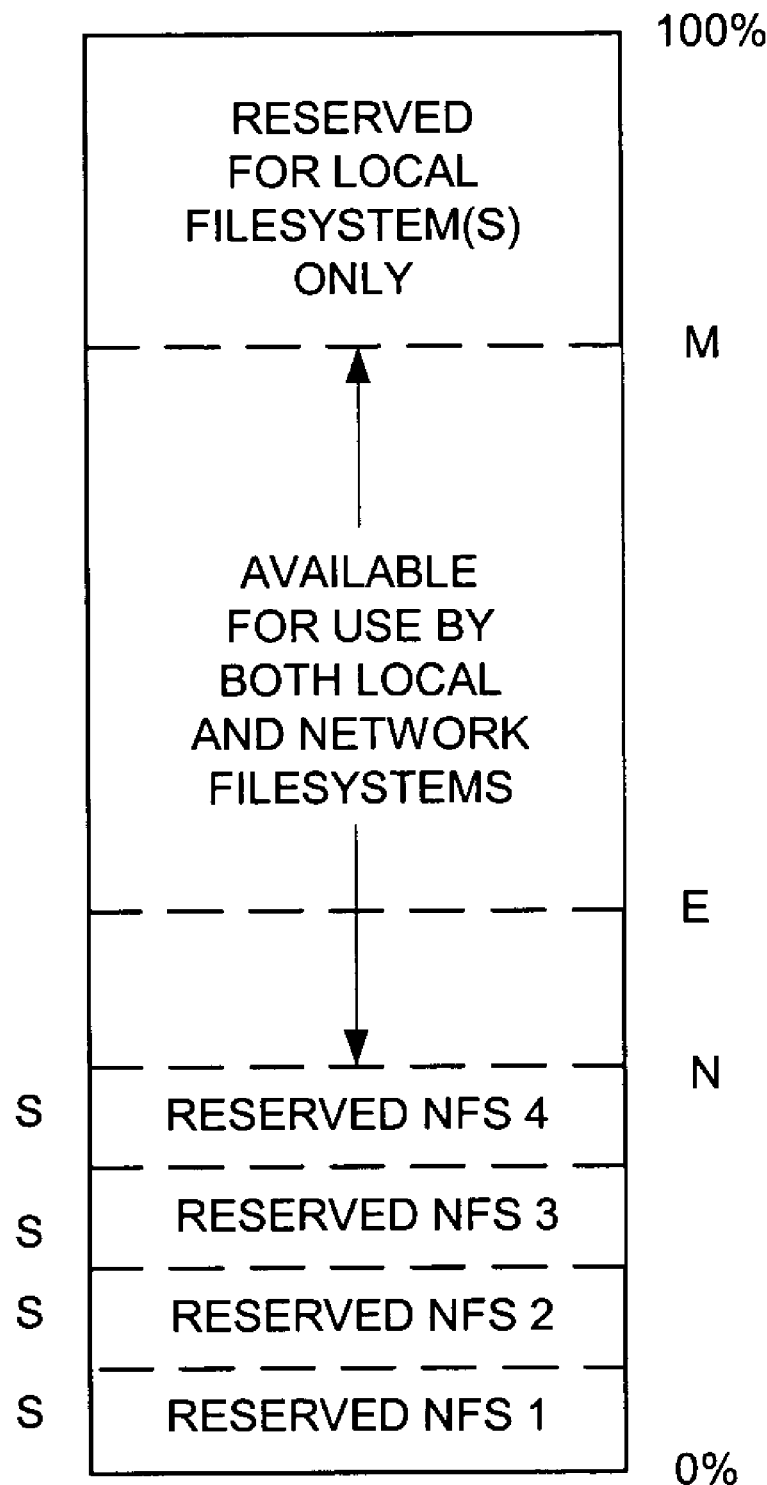
FIG. 3 is a graphical representation of limit ranges applied to network and local filesystems according to the present invention.

A flowchart for processing of a newly generated resource acquisition request according to the invention is illustrated in FIG. 2. First, it is determined 52 whether a maximum number (M) of available resources for use by network resource acquisition requests from a network filesystem. As illustrated in FIG. 3, the "hard limit" M is less than the total number of available shared resources by a predetermined amount of shared resources reserved for local filesystems only. If the hard limit (M) has not been reached, it is determined 54 whether the number of resources in use as reached an enforcement limit (E) smaller than the hard limit (M) by another predetermined amount. The manner by which these predetermined amounts and the "soft limits" discussed below are determined will be described later. If the enforcement limit has not been reached, the number of resources in use is incremented 55 by the number of resources required by the request and the request is executed 56. Depending upon the system, the number of resources in use may be directly tracked (if it is common for a single request to use multiple resources), or the number of outstanding, i.e., currently executing, resource acquisition requests may be tracked as representing the number of resources in use.

When a request from an application occurs, it is necessary to store the data for the request or from the request reply while the request executes. A buffer handle provides a management structure for keeping track of the request and a place to attach a temporary copy of the data used by the request.

For example, when a read request occurs from either a local or network filesystem, a buffer handle must be obtained before pages of memory can be allocated to store the result of the read request. Once the buffer handle and the data storage are ready, the read request can be executed. At some later point in time, notification will be received that the request has completed, and the data requested will be contained in the pages of memory attached to the buffer handle. The application then reads the data out of the temporary storage into its own buffer and releases the buffer handle and pages of memory back into their available pools.

In the case of a write request, once a buffer handle and pages of memory have been acquired, the application copies its data into the buffer and executes the request. In the case of a synchronous write, the application will wait for the request execution to complete and immediately return the buffer handle and memory to their respective available pools. In the case of an asynchronous write request, the application does not wait for the request to complete; it continues onward and hence may have many executing asynchronous write requests at a time. Furthermore, the NFS server may not immediately write the data to disk which leaves a buffer handle whose stored data is in an indeterminate state. Hence when the asynchronous write request completes, the buffer handle is left in an "unstable" state in the first stage of an asynchronous write.

When a buffer handle is in the unstable state, a "write synchronization" must be performed on it before it can be released. This involves a further communication to the server to ensure that the server has written the data to disk before the local resource is freed. A "write synchronization" request can be sent for each unstable buffer or for a range of buffers that hold a contiguous range of data. The "write synchronization" requests can be issued at any time after the asynchronous write request has completed. The write synchronization request is the second stage of an asynchronous write request, and may occur many tens of seconds after the first stage has completed.

As a result of the method used to execute an asynchronous write request, many thousands of asynchronous write requests can be generated and queued for execution in a very short period of time. As CPUs and memory are at least two orders of magnitude faster than a disk, asynchronous writes can be queued very much faster than they can be executed. If left unbounded, the asynchronous writes will consume all available resources and then take an extremely long time (in computer terms) to execute those requests and free up resources.

In comparison, the number of read and metadata requests that can be generated in the same period of time is substantially less. The reason for this is that the number of read and/or metadata requests that can be generated in a given period of time is greatly limited by the fact that the request must be completed (i.e. the data has been retrieved from disk) before the next request can be generated.

Hence, it is the asynchronous write requests that must be limited to stop them from dominating the shared resources. It is also far more important to limit the network resource requests as they take significantly longer to execute than local requests. Therefore the accounting mechanism needed to keep track of the network resource acquisition requests only needs to track the asynchronous write requests as only this type of request has the potential to dominate the entire shared resource.

As illustrated in FIG. 3, there is also a predetermined number (S) of resources reserved for each network filesystem for a total of N resources. As indicated, M minus N resources are available for use by both local and network filesystems. However, since local resource acquisition requests execute more quickly, the enforcement limit E is preferably applied only against network resource acquisition requests.

As illustrated in FIG. 2, if it is determined 54 that the enforcement limit has been reached, it is determined 58 whether the soft limit (S) has been exceeded for the network filesystem that issued the incoming network resource acquisition request. The soft limit (S) is the number of resources reserved for that network filesystem (see FIG. 3). If the soft limit has not been reached, the number of resources in use is incremented 55 and the network resource acquisition request is executed 56.

If it is determined 58 that the soft limit for the network filesystem that issued the incoming network resource acquisition request has been exceeded, the incoming network resource acquisition request is placed 60 in a first-in, first-out (FIFO) soft limit queue for the network filesystem. The network resource acquisition request will remain in the soft limit queue until the executing resource acquisition requests for the corresponding network filesystem are below the soft limit or the newly added resource acquisition request has been held in the soft limit queue longer than a predetermined time period.

If it is determined 52 that the hard limit (M) has been reached, a local flush of the network resource acquisition request is triggered 62. The purpose of the local flush is to free up resources used by asynchronous writes. The local flush results in a scan of the shared resource for buffers that are "related" (i.e., belong to the same file) and are currently in the unstable state. The buffers that are in the unstable state can be freed up quickly by immediately issuing a write synchronization request for those buffers. This then returns the buffers that were unstable back to the free pool much sooner than waiting for them to be stabilized by a background flush process, and hence may enable other requests to be processed now that more resources are available for use.

After the flush 62 is completed, it is again determined 64 whether the maximum number of resources available for network resource acquisition requests are in use. If the flush 62 was successful in releasing enough resources to drop below the hard limit (M), the previously described steps beginning with the determination 54 of whether the enforcement limit (E) has been reached are performed. If the flush 52 was not successful in releasing sufficient resources, the process places 66 the incoming network resource acquisition request in a global hard limit queue used for all network resource acquisition requests and waits for the next incoming network resource acquisition request or completion of an executing network resource acquisition request, or the passage of a predetermined amount of time.

Figure 4:
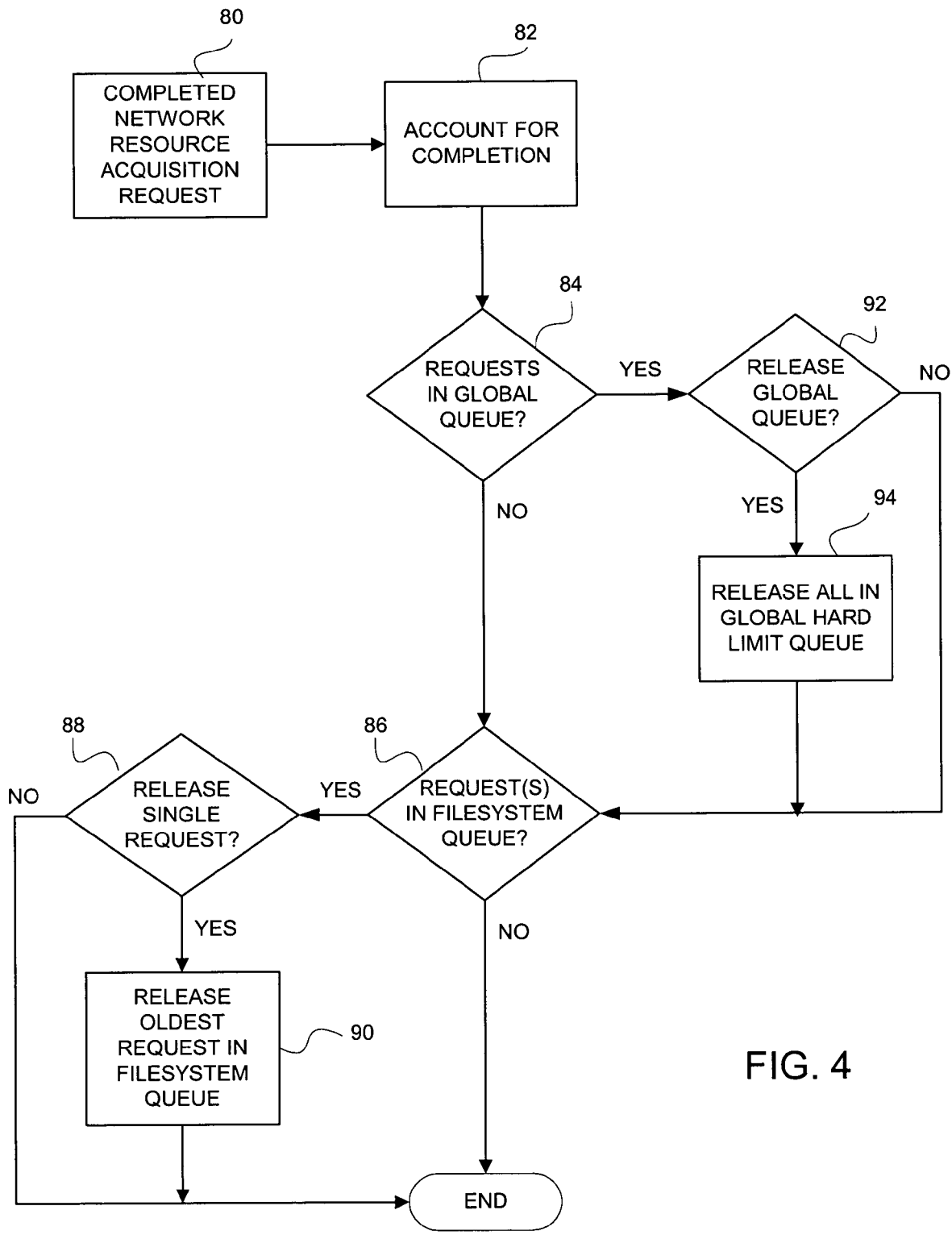
FIG. 4 is a flowchart of processing performed upon completion of a shared resource request.

The operations performed upon completion 80 of a network resource acquisition request are illustrated in FIG. 4. First, there is an accounting 82 for completion of the network resource acquisition request. This includes decrementing the number of requests under execution and, if the resources 20 are handles, upon completion of a synchronous write the handle count is decremented. In the case of an asynchronous write, the handle count is not decremented until the buffer handle has been stabilized via a write synchronization request.

Next, it is determined 84 whether any network resource acquisition request are held in the global hard limit queue. If not, it is determined 86 whether there are any network resource acquisition requests in the soft limit queue for a corresponding network filesystem, i.e., the network filesystem that issued the network resource acquisition request that just completed execution. If it is determined 86 that there are network resource acquisition requests held on the corresponding filesystem soft limit queue, it is determined 88 whether it is OK to release the longest held resource acquisition request for the corresponding filesystem. To avoid repeatedly releasing queued network resource acquisition request(s) only to have the request(s) put into a queue again, preferably the determination 88 of whether to release the longest held resource acquisition request for the corresponding filesystem uses a slightly smaller number than the determination 58 of whether the soft limit (S) has been reached. This is known as using "high and low water marks" in performing comparisons. If the number of executing resource acquisition requests for the corresponding filesystem has dropped below the low water mark, the oldest network resource acquisition request issued by the corresponding network filesystem is released 90 for execution.

If it is determined 84 that there are network resource acquisition requests in the global hard limit queue, it is determined 92 whether the number of executing resource acquisition requests has dropped sufficiently below the hard limit (M) to release 94 all of the held resource acquisition requests for possible execution. These requests may end up on one of the soft limit queues for the network filesystems after it is determined 86 whether the enforcement limit (E) is being applied for that filesystem. Therefore, the determination 92 of whether to release the global hard limit queue preferably uses a low water mark that is less than the hard limit (M).

Figure 5:
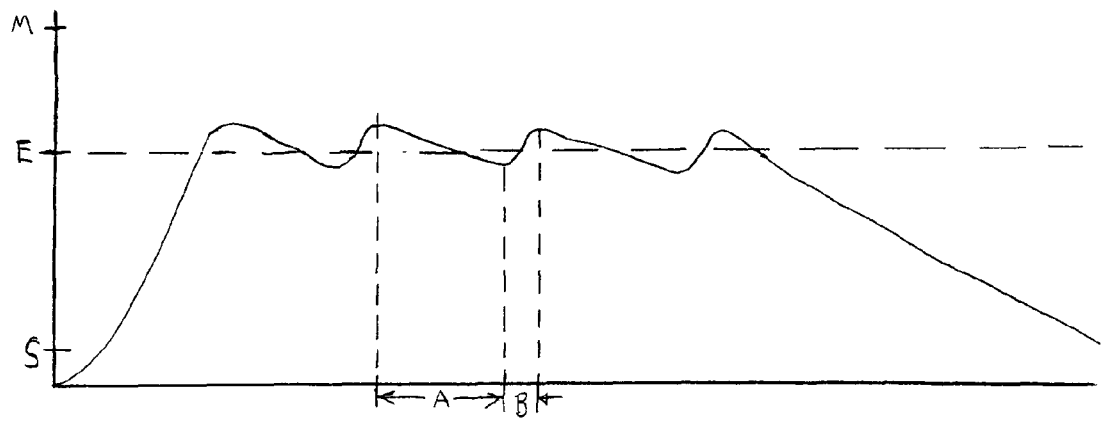
FIGS. 5-7 are graphs of resource usage under three different scenarios.

Three different scenarios of operation of a computing system according to the present invention will be described with reference to FIGS. 5-7. In FIG. 5, a light load of a single network filesystem is illustrated. As the network filesystem issues network resource acquisition requests, the number of executing network resource acquisition requests gradually increases until the enforcement limit (E) is reached and the network resource acquisition requests begin being queued by application. As illustrated in FIG. 5, the number of executing resource acquisition requests may continue to increase due to local network resource acquisition requests. When the number of executing resource acquisition requests drop below the low water mark of the soft limit (S), network acquisition requests are released until both the soft limit (S) high water mark and the enforcement limit (E) are exceeded. This is repeated until the network filesystem stops issuing network resource acquisition requests and there is a gradual decline in the number of executing requests.

Figure 6:
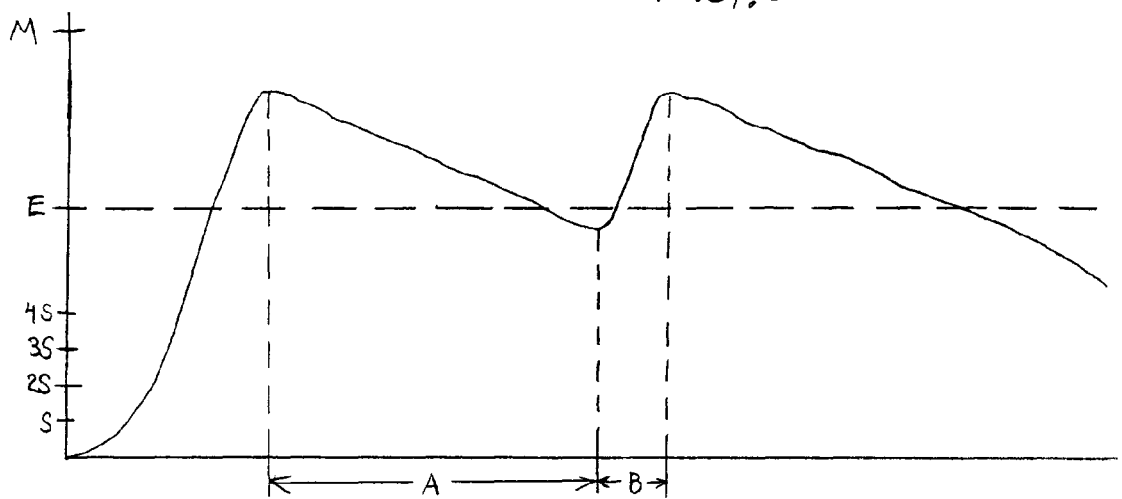

In the example illustrated in FIG. 6, four network filesystems are issuing network resource acquisition requests to produce a medium load. As a result, usage of the shared resources 20 increases faster and may go higher than in the example illustrated in FIG. 5, because a single network filesystem can reach the enforcement limit while the other network filesystem have not reached their reserved number or soft limit (S). The other network filesystems are permitted to continue issuing resource acquisition requests until the reserved number is reached in each, at which point network resource acquisition requests for all four network filesystems will be placed in soft limit queues corresponding to the network filesystems until the number of executing resource acquisition requests falls below the low water mark of the corresponding network filesystem's soft limit (S). The drain rate from the peak to the trough over the time period A in FIG. 6 is substantially the same drain rate over the time period A in FIG. 5. However, since the peak is higher, the time period A is longer in FIG. 6 than in FIG. 5.

Figure 7:
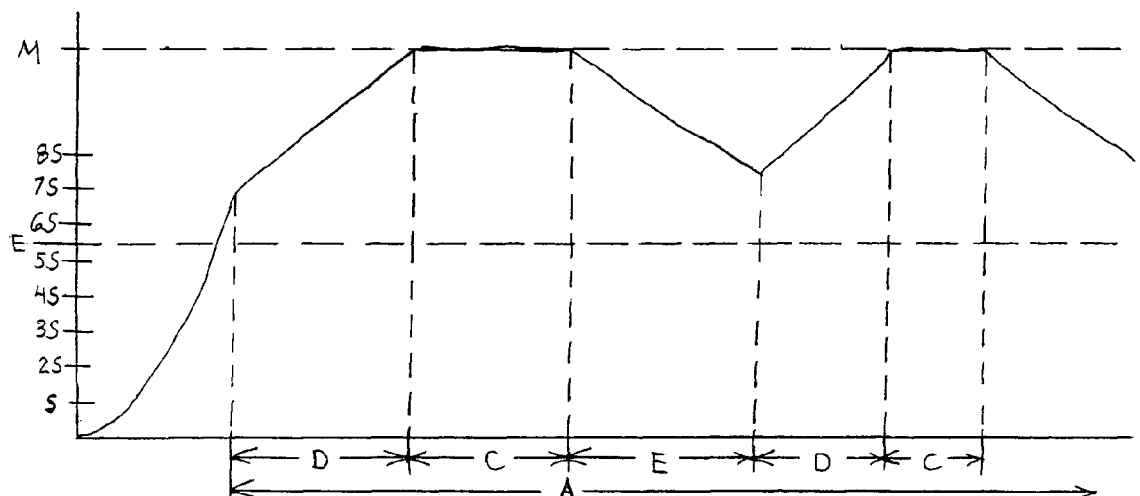

The example illustrated in FIG. 7 is for a heavy load with a larger number of network filesystems that are able to reach the hard limit (M). As discussed above, the hard limit (M) is the maximum number of shared resources available for use by network resource acquisition requests and is less than the total number of shared resources by the number of shared resources available for use by local filesystem(s). In the time periods D, the soft limits are enforced on the filesystem(s) that have exceeded their reserved soft limit(s), but the number of executing resource acquisition requests continue to increase as resource acquisition requests are received from filesystems below their soft limit, until the hard limit (M) is reached. During time period C, subsequently issued network resource acquisition requests are placed in the global hard limit queue. If one or more of the network filesystem(s) stop issuing network resource acquisition requests, the number of executing network resource acquisition requests will drop as illustrated for time periods E. The number can then begin increasing in the second time period D illustrated in FIG. 7, if the number of network filesystems issuing request increases again.

Preferably, at least the enforcement limit is user configurable. In addition, the high and low water marks of the number (M) of resources that may be used by network filesystems and the high and low water marks of the soft limit (S), i.e., the number of resources reserved for each network filesystem, may also be configurable by a user, such as the system administrator.

The present invention has been described with respect to an embodiment operating on computer equipment manufactured by Silicon Graphics, Inc. However, it applicable to many types of operating systems, not only those running variants of UNIX or LINUX, and many types of network operating systems. In addition, soft limits could be configured on a per filesystem basis; the soft limits could be hard limits (i.e., can never be exceeded) to enforce strict usage quotas for each filesystem; multiple soft limits with corresponding enforcement limits could be used to enable more progressive throttling of requests (i.e. S1 is enforced when above E1, S2 is enforced when above E2, etc., where S1>S2>S3> . . . >Sn and E1<E2<E3< . . . <En<M).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of processing requests to access computing resources of a local computer system, comprising:
   restricting, without totally suspending, processing of resource acquisition requests when a number of resources in use in the local computer system is within a first predetermined amount of a maximum number of available resources;
   wherein the resource acquisition requests include local resource acquisition requests generated by at least one local filesystem of the local computer system for access to local storage and network resource acquisition requests generated by at least one network filesystem of the local computer system for access to remote data via a network, wherein each network filesystem has a soft limit of the resources used for executing the network resource acquisition requests;
   wherein the maximum number of available resources represents the available resources for the network resource acquisition requests and in addition, a local reserved number of the resources are available for the local resource acquisition requests;
   wherein restricting processing of resource acquisition requests applies only to the network resource acquisition requests performing asynchronous writes and not the local resource acquisition requests, and wherein said restricting applies an enforcement limit, smaller than the maximum number of available resources by the first predetermined amount, to the network resource acquisition requests;
   wherein said restricting further comprises holding a first network resource acquisition request in a first filesystem queue if execution of the first network resource acquisition request would cause the enforcement limit to be exceeded and the soft limit for a first network filesystem that generated the first network resource acquisition request has been exceeded.

2. A method as recited in claim 1, wherein said holding of the first resource acquisition request and any subsequently received resource acquisition requests for the first network filesystem is continued until at least one of: the executing resource acquisition requests for the first network filesystem are below the soft limit, and the first resource acquisition request has been held on the first filesystem queue longer than a predetermined time period.

3. A method as recited in claim 2, wherein said method further comprises, upon completion of execution of each of the resource acquisition requests, initiating execution of a longest held resource acquisition request in a corresponding network filesystem queue corresponding to the soft limit if the corresponding network filesystem queue is not empty.

4. A method as recited in claim 3, further comprising flushing the network resource acquisition requests related to a new network resource acquisition request if the maximum number of available resources are in use when the new network resource acquisition request is received.

5. A method as recited in claim 4, further comprising holding the new network resource acquisition request and any subsequently received network resource acquisition requests in a global wait queue until the number of resources in use is less than the maximum number of available resources.

6. A method as recited in claim 5, further comprising repeating said flushing of the network resource acquisition requests, until the number of resources in use is less than the maximum number of available resources by at least a second predetermined amount.

7. A method as recited in claim 6, further comprising, upon completion of execution of each of the resource acquisition requests, releasing the new and any subsequently received network resource acquisition requests in the global wait queue, if the number of resources in use is less than the maximum number of available resources by at least the second predetermined amount.

8. A method as recited in claim 7, wherein said initiating execution of the longest held resource acquisition request in the corresponding network filesystem queue is not performed until the executing resource acquisition requests generated by a corresponding network filesystem are below the soft limit by a third predetermined amount.

9. A method as recited in claim 8, wherein the computing resources are handles providing access to data storage for the local and network filesystems.

10. A method as recited in claim 9, wherein at least one of the maximum number of available resources, the enforcement limit, the soft limit and the first, second and third predetermined amounts are configurable by a user.

11. At least one non-transitory computer storage medium storing at least one program embodying a method of processing requests to access computing resources of a local computer system, said method comprising:
   restricting, without totally suspending, processing of resource acquisition requests when a number of resources in use in the local computer system is within a first predetermined amount of a maximum number of available resources;
   wherein the resource acquisition requests include local resource acquisition requests generated by at least one local filesystem of the local computer system for access to local storage and network resource acquisition requests generated by at least one network filesystem of the local computer system for access to remote data via a network, wherein each network filesystem has a soft limit of the resources used for executing the network resource acquisition requests;
   wherein the maximum number of available resources represents the available resources for the network resource acquisition requests and in addition, a local reserved number of the resources are available for the local resource acquisition requests;
   wherein restricting processing of resource acquisition requests applies only to network resource acquisition requests performing asynchronous writes and not local resource acquisition requests, wherein said restricting applies an enforcement limit, smaller than the maximum number of available resources by the first predetermined amount, to the network resource acquisition requests;
   wherein said restricting further comprises holding a first network resource acquisition request in a first filesystem queue if execution of the first network resource acquisition request would cause the enforcement limit to be exceeded and the soft limit for a first network filesystem that generated the first network resource acquisition request has been exceeded.

12. At least one non-transitory computer storage medium as recited in claim 11, wherein said holding of the first resource acquisition request and any subsequently received resource acquisition requests for the first network filesystem is continued until at least one of: the executing resource acquisition requests for the first network filesystem are below the soft limit, and the first resource acquisition request has been held on the first filesystem queue longer than a predetermined time period.

13. At least one non-transitory computer storage medium as recited in claim 12, wherein said method further comprises, upon completion of execution of each of the resource acquisition requests, Initiating execution of a longest held resource acquisition request in a corresponding network filesystem queue corresponding to the soft limit if the corresponding network filesystem queue is not empty.

14. At least one non-transitory computer storage medium as recited in claim 13, further comprising flushing the network resource acquisition requests related to a new network resource acquisition request if the maximum number of available resources are in use when the new network resource acquisition request is received.

15. At least one non-transitory computer storage medium as recited in claim 14, further comprising holding the new network resource acquisition request and any subsequently received network resource acquisition requests in a global wait queue until the number of resources in use is less than the maximum number of available resources.

16. At least one non-transitory computer storage medium as recited in claim 15, further comprising, upon completion of execution of each of the resource acquisition requests, releasing the new and any subsequently received network resource acquisition requests in the global wait queue, if the number of resources in use is less than the maximum number of available resources by at least a second predetermined amount.

17. At least one non-transitory computer storage medium as recited in claim 16, wherein at least one of the maximum number of available resources, the enforcement limit, the soft limit and the first and second predetermined amounts are configurable by a user.

18. A client node, having a limited number of resources, in a network of a plurality of computer system nodes, comprising:
   at least one local disk with local filesystems;
   at least one network filesystem;
   a communication link coupled to the at least one network filesystem to access data under control of another node of the computer system nodes; and
   at least one processor programmed to restrict processing of resource acquisition requests when a number of resources in use at the client node is within a first predetermined amount of a maximum number of available resources;
   wherein the resource acquisition requests include local resource acquisition requests generated by the at least one local filesystem for access to the local storage and network resource acquisition requests generated by the at least one network filesystem for access to remote data via a the communication link;
   wherein restricting processing of resource acquisition requests applies to the network resource acquisition requests and not the local resource acquisition requests, and wherein the restricting processing of resource acquisition requests includes:
   detecting that an enforcement limit has been reached as a result of a new network acquisition request, the enforcement limit being smaller than the maximum number of available resources by the first predetermined amount; and
   placing the new network resource acquisition request in an execution queue associated with the at least one network filesystem when the enforcement limit has been reached and at least a second predetermined number of the resource acquisition requests associated with the network filesystem are being processed.

* * * * *